US011026416B1

(12) United States Patent
Caldwell (10) Patent No.: US 11,026,416 B1
(45) Date of Patent: Jun. 8, 2021

(54) TURKEY CALL HOLDER

(71) Applicant: H. Dennis Caldwell, Smithfield, VA (US)

(72) Inventor: H. Dennis Caldwell, Smithfield, VA (US)

( * ) Notice: Subject to any disclaimer, the term of this patent is extended or adjusted under 35 U.S.C. 154(b) by 0 days.

(21) Appl. No.: 17/201,459

(22) Filed: Mar. 15, 2021

(51) Int. Cl.
*A45F 5/00* (2006.01)
*A01M 31/00* (2006.01)

(52) U.S. Cl.
CPC .............. *A01M 31/004* (2013.01); *A45F 5/00* (2013.01); *A45F 2005/008* (2013.01); *A45F 2200/0508* (2013.01)

(58) Field of Classification Search
CPC .......... A45F 2005/008; A45F 2003/003; A45F 2005/1006; A45F 2200/0516; A45F 2200/0525; A01M 31/004; A45C 2001/028; Y10S 224/91; Y10S 224/93
USPC ............... 224/219, 222, 165, 242, 245, 918, 224/169–170, 247–248, 904
See application file for complete search history.

(56) References Cited

U.S. PATENT DOCUMENTS

| | | | | |
|---|---|---|---|---|
| 3,977,674 A | * | 8/1976 | Zeller | A63B 57/353 473/285 |
| 5,244,204 A | * | 9/1993 | Zeller | A63B 57/353 473/285 |
| 5,244,430 A | * | 9/1993 | Legursky | A01M 31/004 224/222 |
| 5,305,381 A | * | 4/1994 | Wang | B60R 11/0241 379/426 |
| 6,095,470 A | * | 8/2000 | Kalis | B60R 11/02 248/309.1 |
| 6,438,229 B1 | * | 8/2002 | Overy | H02J 7/0044 379/446 |
| 6,599,167 B2 | * | 7/2003 | Waltz | A01M 31/004 43/1 |
| 6,955,582 B1 | * | 10/2005 | Forbes | A01M 31/004 446/397 |
| 7,008,290 B1 | * | 3/2006 | Bean | A01M 31/004 446/206 |
| 7,920,905 B2 | * | 4/2011 | Bury | H04M 1/04 455/575.1 |
| 2008/0274666 A1 | * | 11/2008 | Weider | A45F 5/00 446/207 |

* cited by examiner

*Primary Examiner* — Adam J Waggenspack
(74) *Attorney, Agent, or Firm* — Peter J. Van Bergen (57) ABSTRACT

A turkey call holder includes an open-top receptacle for receiving a pot call there through such that at least a portion of the pot call resides within the receptacle. Clamping shoes, disposed in opposition to one another within the receptacle, are elastically biased towards one another by at least one elastic member such that the clamping shoes engage opposing sides of a portion of the pot call residing within the receptacle. A flexible strap is coupled to the receptacle for securing the receptacle to a limb of a user.

20 Claims, 6 Drawing Sheets

TURKEY CALL HOLDER

FIELD OF THE INVENTION

The invention relates generally to game call holders, and more particularly to a holder for turkey calls.

BACKGROUND OF THE INVENTION

Turkey hunters frequently use some type of "call" to attract their prey. Two of the most well-known types of calls are pot calls and box calls. Briefly, pot calls are generally cylindrical in shape and have a top surface that is rubbed with a hand-held striker to produce a call sound. Box calls are generally open-top rectangular wooden boxes having a pivotally attached wooden lid that can be moved/slid back-and-forth across the top of the box to produce a call sound.

Regardless of which type of call a hunter chooses to use, they each require two hands to generate a call sound. That is, one hand holds the call and the other hand moves the striker or the call's wooden lid to produce the call sound. The need to use two hands means the hunter has to move to re-position their weapon to make a call, and then move again to place their weapon back into a firing position after the call is made. However and as turkey hunters are well aware, body movements while turkey hunting need to be minimized owing to turkeys' keen sensitivities and skittishness to movements in the wild.

SUMMARY OF THE INVENTION

Accordingly, it is an object of the present invention to provide a turkey call holder.

Another object of the present invention is to provide a turkey call holder that allows a hunter to produce a call sound using one hand.

Still another object of the present invention is to provide a turkey call holder adaptable for use with a variety of pot calls and box calls.

A still further object of the present invention is to provide a turkey call holder that requires minimal user movement when generating a call sound.

Other objects and advantages of the present invention will become more obvious hereinafter in the specification and drawings.

In accordance with the present invention, a turkey call holder includes a receptacle having an open top adapted to receive a pot call there through wherein at least a portion of the pot call resides within the receptacle. Two clamping shoes are disposed in opposition to one another within the receptacle. At least one elastic member is provided to elastically bias the clamping shoes towards one another wherein the clamping shoes are adapted to engage opposing sides of a portion of the pot call residing within the receptacle. A flexible strap is coupled to the receptacle for securing the receptacle to a limb of a user.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
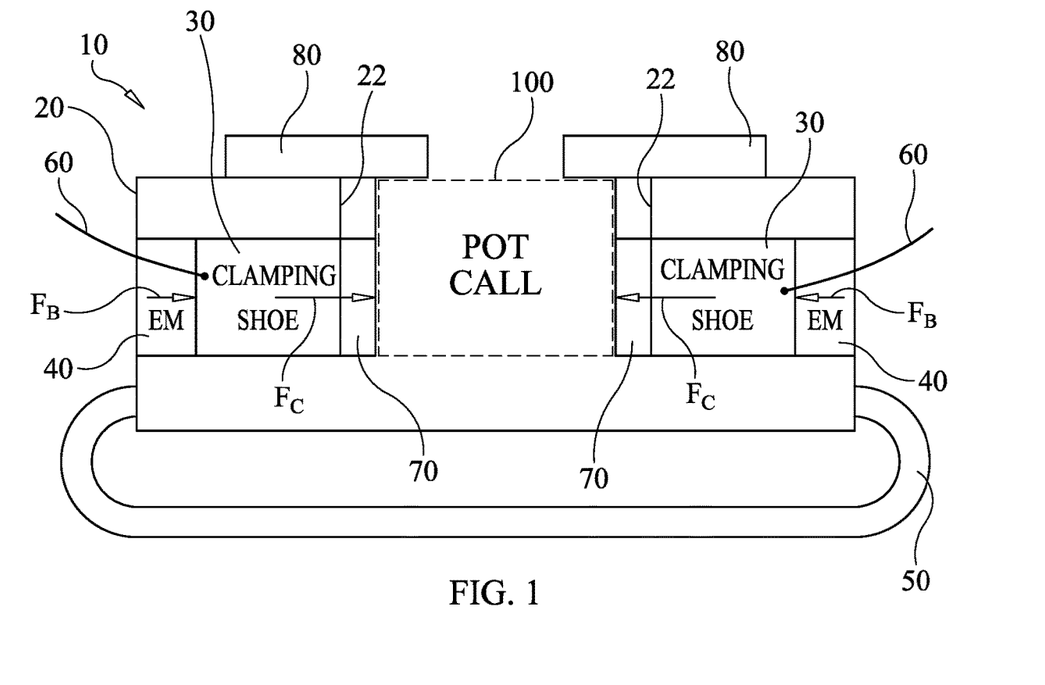
FIG. 1 is a schematic view of a turkey call holder in accordance with an embodiment of the present invention.

Referring now to the drawings and more particularly to FIG. 1, a side schematic view of a turkey call holder accordance with an embodiment of the present invention is shown and is referenced generally by numeral 10. Turkey call holder 10 is designed for use with a variety of pot calls such as a straight-side pot call 100 that is indicated throughout the figures by dashed lines. However and as will be explained further below, turkey call holder 10 can also be used with tapered-side pot calls as well as being adaptable for use with box calls. For each type of call, holder 10 is configured such that a user can produce call sounds using a single hand. To make one-handed call generation possible, turkey call holder 10 is configured to be secured to a user's limb (e.g., a user's thigh) thereby positioning the retained call 100 in an optimal position for single-handed operation of the retained call.

Turkey call holder 10 includes a receptacle 20, clamping shoes 30 disposed within receptacle 20, one or more elastic members ("EM") 40 cooperating with clamping shoes 30, and a flexible strap 50 coupled to receptacle 20. It is to be understood that each of receptacle 20, clamping shoes 30, elastic members 40, and strap 50 can be constructed in a variety of ways without departing from the scope of the present invention. Accordingly, the description of turkey call holder 10 will focus on the critical features thereof and not particular construction details. However, an exemplary embodiment of the present invention will be shown and described later herein.

Receptacle 20 is a generally lightweight rigid structure that can be a monolithic structure or assembled from parts. Suitable materials for receptacle 20 include wood, plastics, composites, metals, or combinations thereof. Receptacle 20 has an opening 22 in a top thereof that is sized to receive pot call 100. In general, opening 22 has as diameter that is large enough to accommodate the largest pot call of interest.

Clamping shoes 30 are positioned at opposing sides of and within receptacle 20. Each clamping shoe 30 is movable (e.g., slidable) within receptacle 30. Shoes 30 are in direct opposition to one another for applying opposing clamping forces $F_C$ to opposing sides of pot call 100. In general, the opposing clamping forces $F_C$ are provided by elastic members 40, each of which applies an elastic biasing force $F_B$ to a respective clamping shoe 30 causing application of a corresponding clamping force $F_C$. Elastic members 40 can be independent mechanisms or a single mechanism without departing from the scope of the present invention.

Flexible strap 50 can be any of a variety of strap designs (e.g., webbed, leather, elastic, cloth, etc.) that is coupled to receptacle 20 in a way that allows turkey call holder 10 to be secured to a user's limb. In most instances, it will be desirable to secure turkey call holder 10 to a user's thigh for easy access with minimal body movement. Strap 50 can be attached/coupled to or integrated with receptacle 20 in a variety of ways, the choice of which is not a limitation of the present invention. Strap 50 can be permanently attached or removably attached to receptacle 20. Strap 50 can include a clip or buckle (not shown) along its length to facilitate its adjustment in size as well as its placement on or removal from a user's limb.

In use, one or both of clamping shoes 30 is moved against biasing force $F_B$ so that pot call 100 can be placed partially or fully in receptacle 20 where clamping shoes 30 can then apply opposing clamping forces $F_C$ thereto. To facilitate movement of one or both of clamping shoes 30 in opposition to their biasing force(s) $F_B$, a line 60 (e.g., string, wire, cord, strap, etc.) can be coupled to each of clamping shoes 30. Each line 60 extends from receptacle 20 so that a user can apply tension to either or both of lines 60 that is greater than biasing force $F_B$ thereby causing shoes 30 to be drawn away from one another to allow pot call 100 to fit there between. Releasing tension in line(s) 60 allows biasing force $F_B$ to be restored such that clamping forces $F_C$ are applied to pot call 100.

A compressible material or pad 70 can be provided on each of clamping shoes 30 at locations thereon that will engage pot call 100 within receptacle 20. Pad(s) 70 can be selected to protect the outer surface of pot call 100, improve retention of pot call 100, and/or allow shoes 30 to more readily adapt to engagement with a tapered-side pot call (not shown).

Turkey call holder 10 can also include one or more retainers 80 coupled to receptacle 20 near its top opening 22. Retainer(s) 80 are used when a pot call 100 is of a size that it can be fully resident within receptacle 20 as shown in FIG. 1. For example, retainer(s) 80 can pivot or slide to a position that fully exposes opening 22 during installation of pot call 100. Once pot call 100 is in its clamped position within receptacle 20, retainer(s) 80 are repositioned such that they engage a top of pot call 100 as shown.

Figure 2:
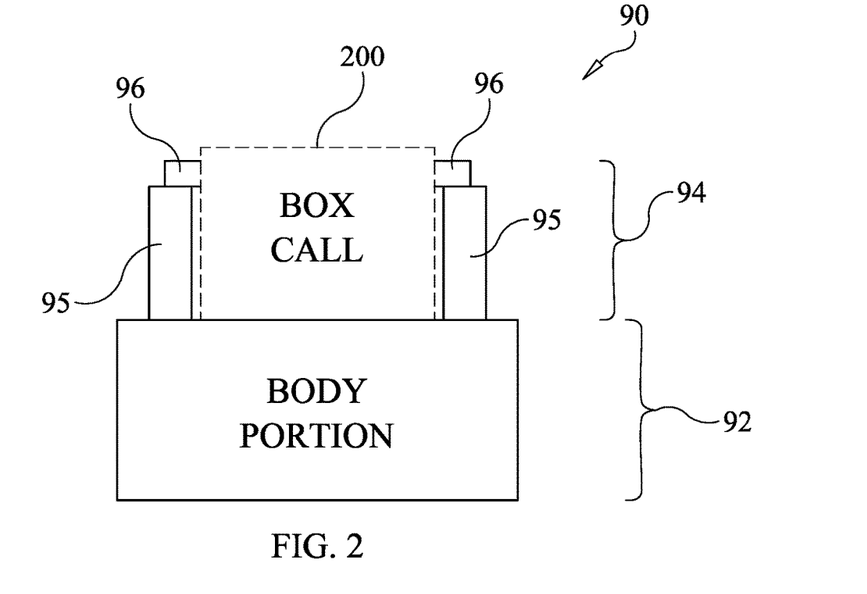
FIG. 2 is a schematic view of a box call adapter for use with the turkey call holder of the present invention.
Figure 3:
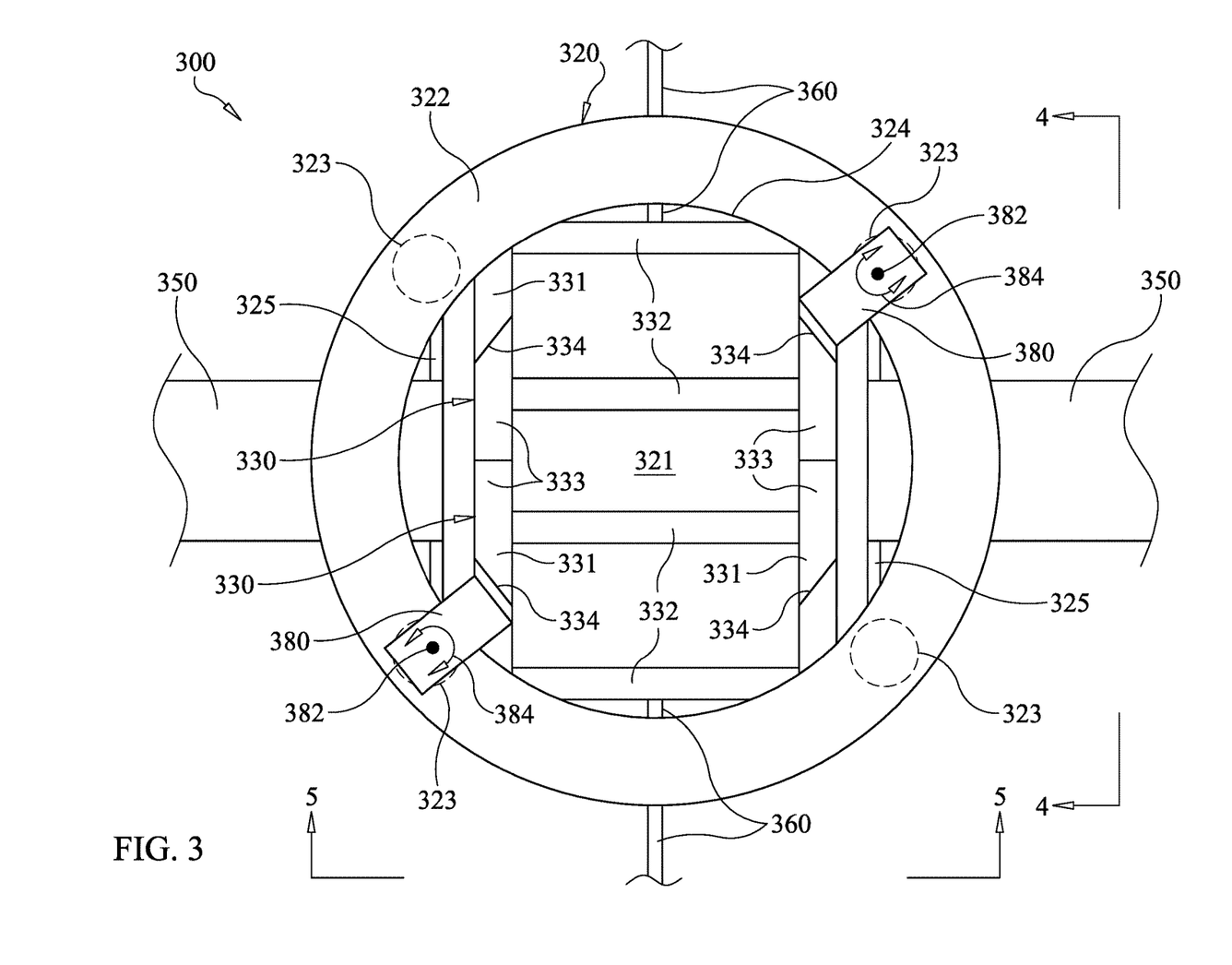
FIG. 3 is a top plan view of a turkey call holder in accordance with an exemplary embodiment of the present invention.

As mentioned above, turkey call holder 10 can be readily adapted to hold a box call. More specifically and with reference to FIG. 2, a box call adapter 90 includes a body portion 92 and a box call retaining portion 94 coupled to body portion 92. Body portion 92 is sized/shaped to mimic the dimensions of pot call 100 such that body portion 92 is readily retained by turkey call holder 10 as retaining portion 94 is held just above receptacle 20. In general, retaining portion 94 includes side walls 95 with one or more retainers 96 coupled to side walls 95. In use, body portion 92 is placed in turkey call holder 10 in place of pot call 100 and a box call 200 (indicated by dashed lines in FIG. 2) is placed between side walls 95. Retainers 96 are then used to engage/retain box call 200 on adapter 90. It is to be understood that the construction of retaining portion 94 can be achieved in a variety of ways without departing from the scope of the present invention.

An exemplary embodiment of the present invention will now be described with reference to FIGS. 3-12. Referring first and simultaneously to FIGS. 3-6, an exemplary turkey call holder is illustrated and is referenced generally by numeral 300. Turkey call holder 300 includes an open framework receptacle 320 constructed from a base plate 321, a top plate 322, and a number of connectors 323 (e.g., four in the illustrated embodiment) that couple plates 321 and 322 together and spaces them apart from one another. Receptacle 320 can be monolithic or assembled from parts without departing from the scope of the present invention. Top plate 322 has an opening 324 dimensioned to accommodate the largest pot call (not shown) of interest. One or more retainers 380 (e.g., two in the illustrated embodiment) can be provided on top plate 322 adjacent to opening 324. Each retainer 380 is coupled to top plate 322 at a pivot point 382 such that the retainers can be rotated away from opening 324 or rotated to extend partially over opening 324 as indicated by two-headed rotation arrow 384.

Base plate 321 has a plurality of slots 325 passing there through to provide for engagement with a strap 350 that will be used to attach turkey call holder 300 to a user's limb as previously described above for turkey call holder 10. As also described above, strap 350 can be configured in a variety of ways without departing from the scope of the present invention. For clarity of illustration, strap 350 has been omitted from FIGS. 4-6. Base plate 321 also has open-ended slots or notches 326 at opposing sides thereof. Each of notches 326 is used to retain a line 360 extending from receptacle 320 as will be explained further below.

Figure 5:
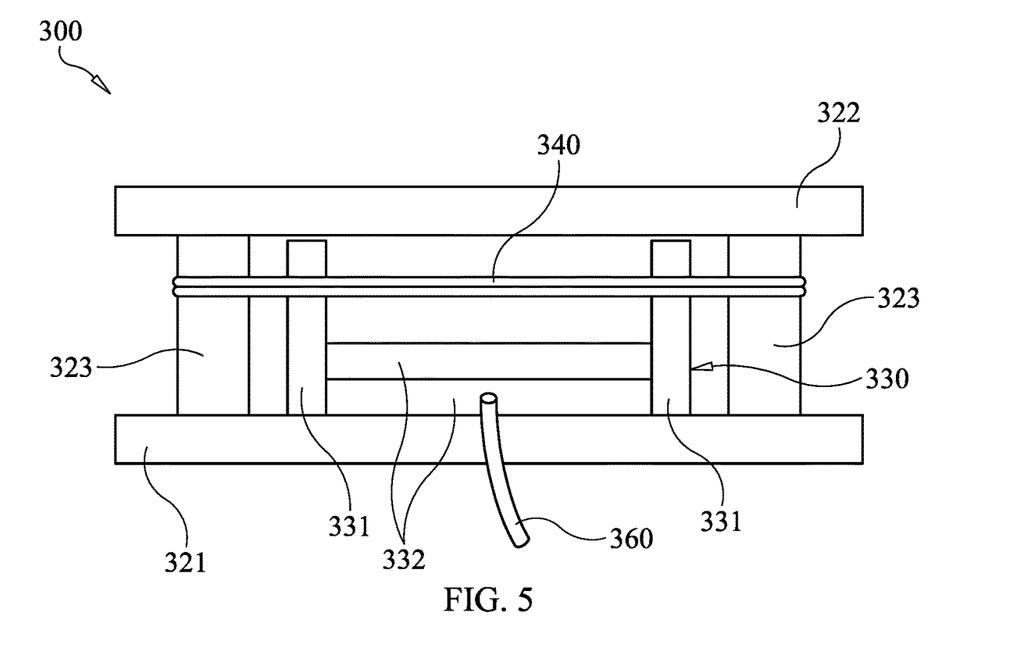
FIG. 5 is an end view of the turkey call holder illustrated in FIG. 3 as viewed along line 5-5 thereof.
Figure 6:
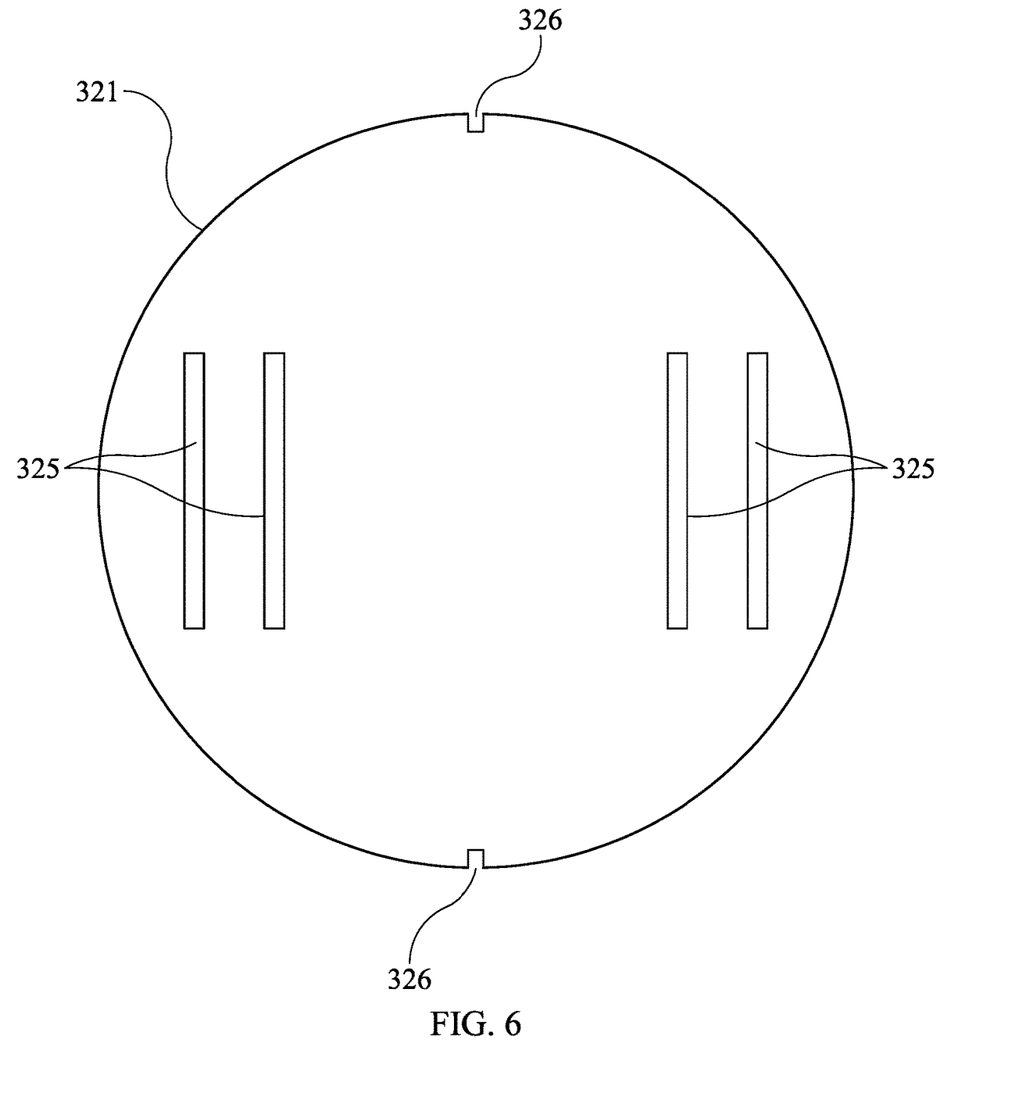
FIG. 6 is a bottom plan view of the turkey call holder illustrated in FIG. 3.
Figure 7:
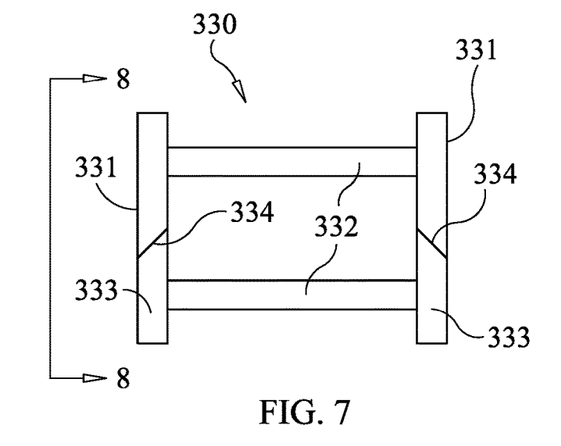
FIG. 7 is an isolated plan view of a single clamping shoe for use with a straight-side pot call in accordance with an embodiment of the present invention.
Figure 8:
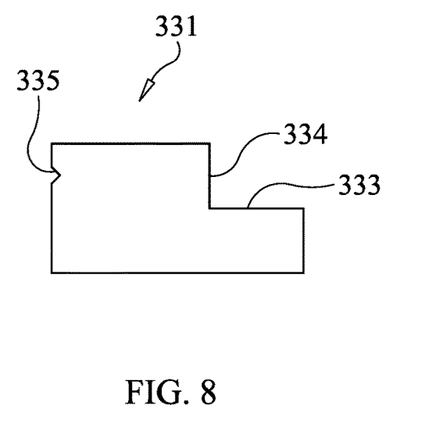
FIG. 8 is a side view of the clamping shoe illustrated in FIG. 7 as viewed along line 8-8 thereof.
Figure 9:
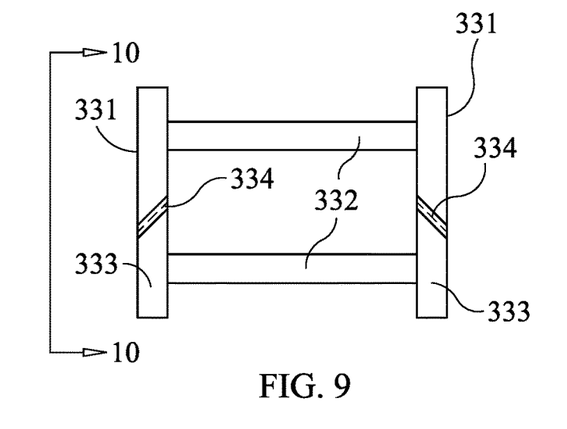
FIG. 9 is an isolated plan view of a single clamping shoe for use with a tapered-side pot call in accordance with an embodiment of the present invention.
Figure 10:
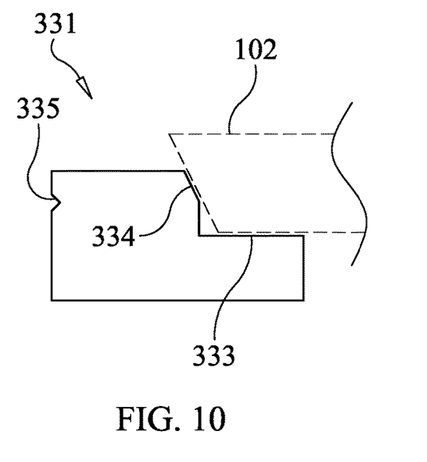
FIG. 10 is a side view of the clamping shoe illustrated in FIG. 9 as viewed along line 10-10 thereof.

Disposed within receptacle 320 for sliding movement between plates 321 and 322 are two clamping shoes 330. Each of clamping shoes 330 fits/slides between a pair of connectors 323 as best seen in FIG. 5. In general, each clamping shoe 330 has two side walls 331 connected and separated by cross members 332. Referring additionally to FIGS. 7 and 8, clamping shoe 330 can be configured to have L-shaped side walls 331. The base 333 of the L-shape defines a part of a floor on which a pot call 100 will rest and the leg 334 of the L-shape defines a contact area for the side of pot call 100 when shoes 330 are elastically biased there against. Leg 334 can be cut at an angle as shown in FIG. 7 to accommodate the curved perimeter of pot call 100. Shoes 330 can be modified slightly to better accommodate a tapered-side pot call as illustrated in FIGS. 9 and 10. More specifically, legs 334 in FIGS. 9 and 10 are tapered outward to accommodate a tapered-side pot call 102 that is illustrated in portion by dashed lines 102. Although not shown for clarity of illustration, the faces of each of legs 334 can have a compressible and/or grip material/pad (e.g., pads 70 illustrated in FIG. 1) applied thereto as described above for interfacing with the side walls of a pot call.

Figure 4:
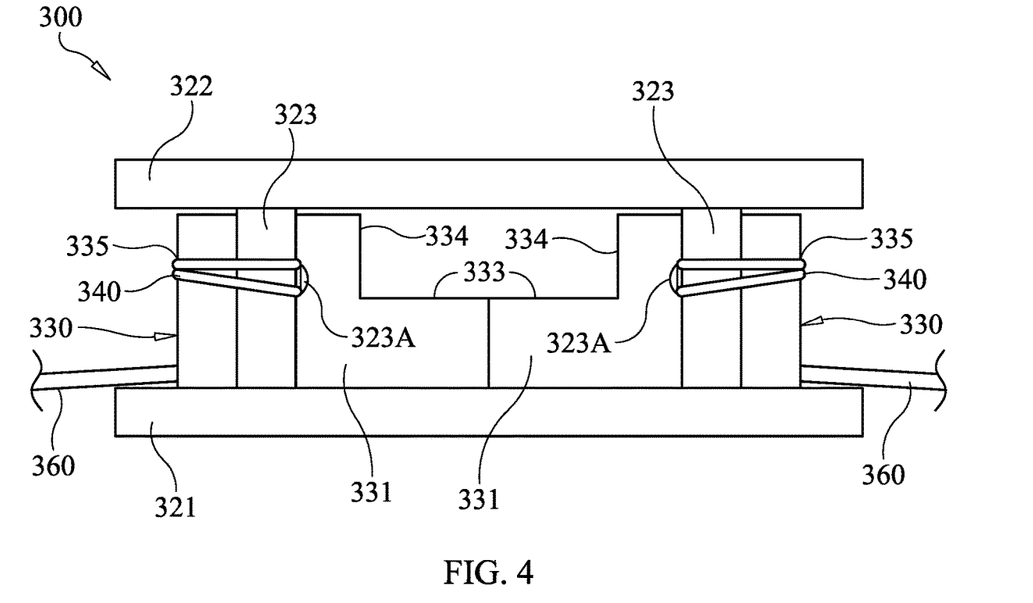
FIG. 4 is a side view of the turkey call holder illustrated in FIG. 3 as viewed along line 4-4 thereof.

Each clamping shoe 330 is elastically biased towards the opposing clamping shoe using an elastic band. More specifically, a conventional elastic band 340 is coupled to a pair of connectors 323 to provide the elastic biasing force. For example, elastic band 340 can be looped about a post 323A on each connector 323 as shown in FIG. 4. Each elastic band 340 then engages the back of a clamping shoe 330 that can be provided with a notch 335 (FIGS. 8 and 10) for retention of elastic band 340. Elastic bands 340 provide the above-described opposing elastic biasing forces that, in turn, cause clamping shoes 330 to apply opposing clamping forces to a pot call that is at least partially resident in receptacle 320.

Each clamping shoe 330 has a line 360 attached thereto at, for example, a cross member 332. Each line 360 extends from receptacle 320. When one or both shoes 330 are to be drawn away from one another to accommodate insertion of a pot call, a user applies tension to line(s) 360 to overcome the biasing force provided by elastic bands 340. The applied tension force to a clamping shoe 330 can be maintained in a hands-free fashion by locking line 360 into one of notches 326 (FIG. 6) in base plate 321.

Figure 11:
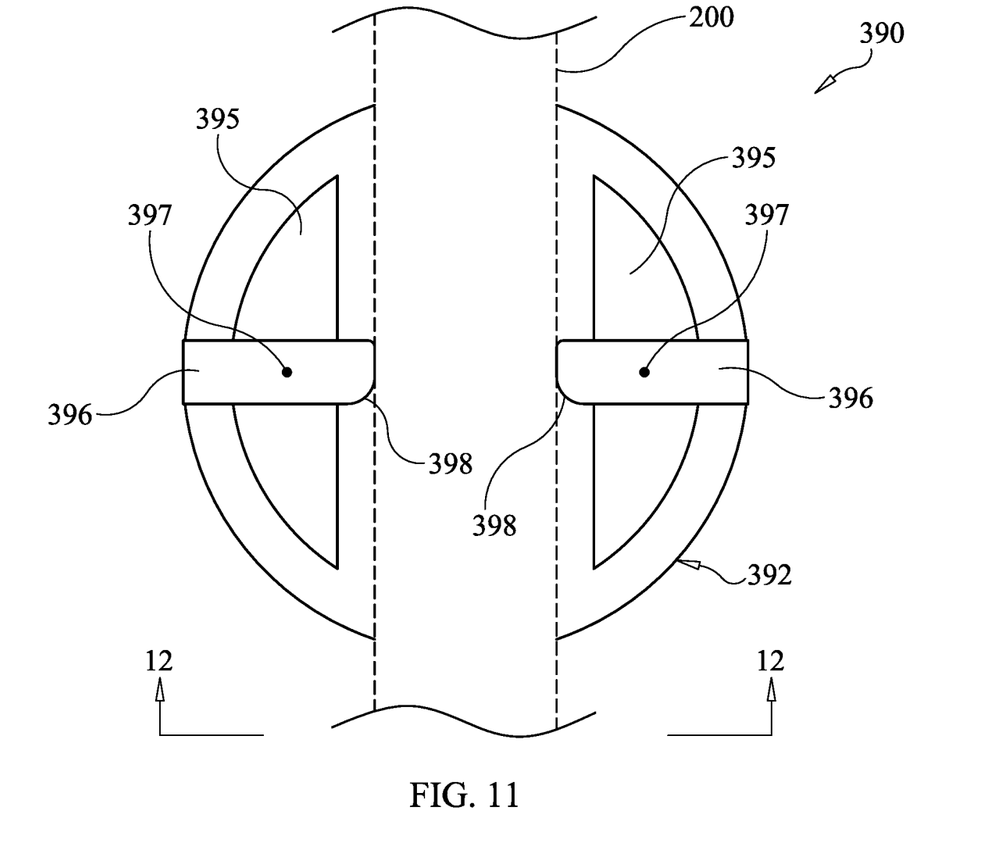
FIG. 11 is a top plan view of a box call adapter for use with the turkey call holder illustrated in FIGS. 3-6.
Figure 12:
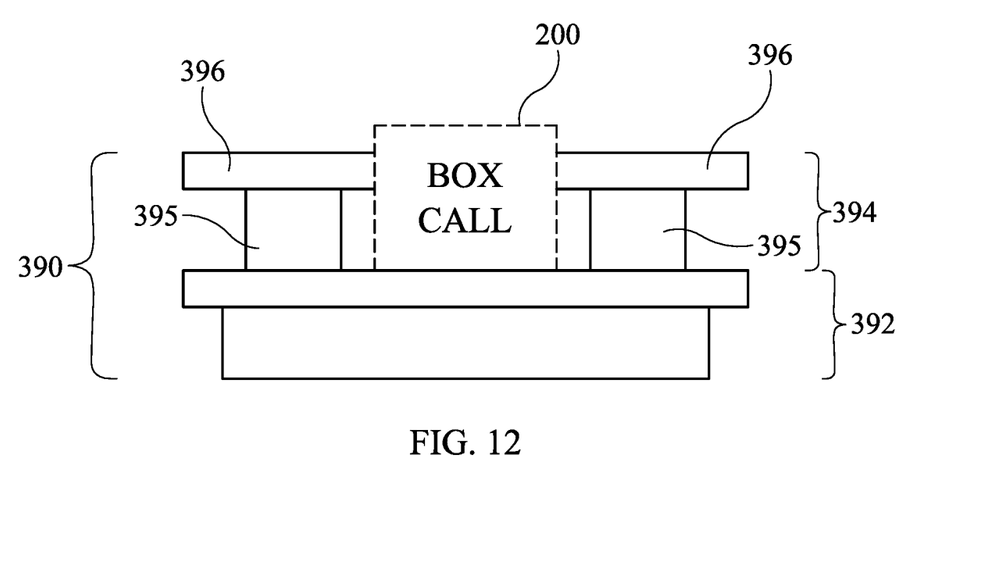
FIG. 12 is a side view of the box call adapter illustrated in FIG. 11 as viewed along line 12-12 thereof.

An exemplary box call adapter 390 for use with turkey call holder 300 is illustrated in a plan view thereof in FIG. 11 and in a side view thereof in FIG. 12. Adapter 390 has a body portion 392 that is sized/shaped to mimic, for example, a straight-side pot call such that body portion 392 can be retained in receptacle 320 in the same way as a pot call. Adapter 390 also has a box call retaining portion 394 defined by side walls 395 and retainers 396. Side walls 395 accommodate a box call 200 there between while retainers 396 engage the side walls of box call 200. For example, retainers 396 can be coupled to the tops of side walls 395 at pivot points 397. Since box calls are generally made of wood, retainers 396 can be beveled at their outboard ends 398 to facilitate a non-damaging pressed engagement with box call 200 thereby holding it in place.

The advantages of the present invention are numerous. The turkey call holder supports a variety of conventional turkey calls in a way that allows a user to produce a call sound using one hand. The holder allows the retained call to be placed in a position that will minimize a user's movement when a call is to be generated.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A turkey call holder, comprising:
    a receptacle having an open top adapted to receive a pot call there through wherein at least a portion of the pot call resides within said receptacle;
    a pair of clamping shoes disposed in opposition to one another within said receptacle;
    at least one elastic member for elastically biasing said clamping shoes towards one another wherein said clamping shoes are adapted to engage opposing sides of a portion of the pot call residing within said receptacle; and
    a flexible strap coupled to said receptacle and adapted to secure said receptacle to a limb of a user.

2. A turkey call holder as in claim 1, further comprising at least one retainer coupled to said receptacle, said at least one retainer adapted to engage a top of the pot call that is fully resident within said receptacle.

3. A turkey call holder as in claim 1, wherein said at least one elastic member comprises:
    a first elastic band coupled to said receptacle for applying a first biasing force to a first of said clamping shoes; and
    a second elastic band coupled to said receptacle for applying a second biasing force to a second of said clamping shoes, wherein said first biasing force is in direct opposition to said second biasing force.

4. A turkey call holder as in claim 1, further comprising:
    a first line coupled to a first of said clamping shoes; and
    a second line coupled to a second of said clamping shoes, wherein said clamping shoes are drawn away from one another by a tension force applied to at least one of said first line and said second line.

5. A turkey call holder as in claim 3, further comprising:
    a first line coupled to said first of said clamping shoes and extending from said receptacle, said first line adapted to have a first tension force applied thereto for application to said first of said clamping shoes;
    a first notch in said receptacle for retaining said first line therein wherein said first tension force applied to said first of said clamping shoes is maintained;
    a second line coupled to said second of said clamping shoes and extending from said receptacle, said second line adapted to have a second tension force applied thereto for application to said second of said clamping shoes; and
    a second notch in said receptacle for retaining said second line therein wherein said second tension force to said second of said clamping shoes is maintained.

6. A turkey call holder as in claim 1, further comprising a compressible material coupled to each of said clamping shoes at locations thereon where said clamping shoes engage the opposing sides of the portion of the pot call residing within said receptacle.

7. A turkey call holder as in claim 1, further comprising an adapter having a body portion and a retaining portion, said body portion configured as a pot call, said retaining portion coupled to a top of said body portion and adapted to retain a box call there against.

8. A turkey call holder, comprising:
    a receptacle having an open top adapted to receive a pot call there through wherein at least a portion of the pot call resides within said receptacle;
    a pair of movable clamping shoes disposed in opposition to one another within said receptacle;
    a pair of elastic members, each of said elastic members coupled to said receptacle and to one of said clamping shoes, wherein said clamping shoes are elastically biased for movement towards one another within said receptacle, and wherein said clamping shoes are adapted to engage opposing sides of a portion of the pot call residing within said receptacle; and
    a flexible strap coupled to said receptacle and adapted to secure said receptacle to a limb of a user.

9. A turkey call holder as in claim 8, further comprising at least one retainer coupled to said receptacle, said at least one retainer adapted to engage a top of the pot call that is fully resident within said receptacle.

10. A turkey call holder as in claim 8, further comprising:
    a first line coupled to a first of said clamping shoes; and
    a second line coupled to a second of said clamping shoes, wherein said clamping shoes are drawn away from one another by a tension force applied to at least one of said first line and said second line.

11. A turkey call holder as in claim 8, further comprising:
    a first line coupled to a first of said clamping shoes and extending from said receptacle, said first line adapted to have a first tension force applied thereto for application to said first of said clamping shoes;
    a first notch in said receptacle for retaining said first line therein wherein said first tension force applied to said first of said clamping shoes is maintained;
    a second line coupled to a second of said clamping shoes and extending from said receptacle, said second line adapted to have a second tension force applied thereto for application to said second of said clamping shoes; and a second notch in said receptacle for retaining said second line therein wherein said second tension force to said second of said clamping shoes is maintained.

12. A turkey call holder as in claim 8, further comprising a compressible material coupled to each of said clamping shoes at locations thereon where said clamping shoes engage the opposing sides of the portion of the pot call residing within said receptacle.

13. A turkey call holder as in claim 8, further comprising an adapter having a body portion and a retaining portion, said body portion configured as a pot call, and said retaining portion coupled to a top of said body portion and adapted to retain a box call there against.

14. A turkey call holder, comprising:
- a receptacle having a base plate, a top plate, and connectors for coupling said top plate to said base plate wherein said base plate and said top plate are spaced apart from one another, said top plate having an opening adapted to receive a pot call there through wherein at least a portion of the pot call resides above said base plate within said receptacle, said base plate having a plurality of slots there through;
- a pair of clamping shoes resting on said base plate and disposed in opposition to one another within said receptacle;
- at least one elastic member for elastically biasing said clamping shoes towards one another wherein said clamping shoes are adapted to engage opposing sides of a portion of the pot call residing within said receptacle; and
- a flexible strap engaging at least two of said slots in said base plate and adapted to secure said receptacle to a limb of a user.

15. A turkey call holder as in claim 14, further comprising at least one retainer coupled to said top plate, said at least one retainer adapted to engage a top of the pot call that is fully resident within said receptacle.

16. A turkey call holder as in claim 14, wherein said at least one elastic member comprises:

- a first elastic band coupled to a first pair of said connectors for applying a first biasing force to a first of said clamping shoes; and
- a second elastic band coupled to a second pair of said connectors for applying a second biasing force to a second of said clamping shoes, wherein said first biasing force is in direct opposition to said second biasing force.

17. A turkey call holder as in claim 14, further comprising:
- a first line coupled to a first of said clamping shoes; and
- a second line coupled to a second of said clamping shoes, wherein said clamping shoes are drawn away from one another by a tension force applied to at least one of said first line and said second line.

18. A turkey call holder as in claim 16, further comprising:
- a first line coupled to said first of said clamping shoes and extending from said receptacle, said first line adapted to have a first tension force applied thereto for application to said first of said clamping shoes;
- a first notch in said base plate for retaining said first line therein wherein said first tension force applied to said first of said clamping shoes is maintained;
- a second line coupled to said second of said clamping shoes and extending from said receptacle, said second line adapted to have a second tension force applied thereto for application to said second of said clamping shoes; and
- a second notch in said base plate for retaining said second line therein wherein said second tension force to said second of said clamping shoes is maintained.

19. A turkey call holder as in claim 14, further comprising a compressible material coupled to each of said clamping shoes at locations thereon where said clamping shoes engage the opposing sides of the portion of the pot call residing within said receptacle.

20. A turkey call holder as in claim 14, further comprising an adapter having a body portion and a retaining portion, said body portion configured as a pot call, said retaining portion coupled to a top of said body portion and adapted to retain a box call there against.

\* \* \* \* \*